(12) United States Patent
Miao et al.

(10) Patent No.: US 8,121,555 B2
(45) Date of Patent: Feb. 21, 2012

(54) TRANSMISSION POWER CONTROL IN HSPDA

(75) Inventors: Qingyu Miao, Beijing (CN); Xinyu Gu, Beijing (CN); Hai Wang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 231 days.

(21) Appl. No.: 12/527,468

(22) PCT Filed: Feb. 20, 2007

(86) PCT No.: PCT/SE2007/050097
§ 371 (c)(1),
(2), (4) Date: Aug. 17, 2009

(87) PCT Pub. No.: WO2008/103085
PCT Pub. Date: Aug. 28, 2008

(65) Prior Publication Data
US 2010/0035646 A1    Feb. 11, 2010

(51) Int. Cl.
*H04B 1/00* (2006.01)
*H04B 7/00* (2006.01)
*H04Q 11/12* (2006.01)
(52) U.S. Cl. .................. 455/69; 455/522; 455/127.1
(58) Field of Classification Search ............ 455/522, 455/69, 127.1
See application file for complete search history.

(56) References Cited

U.S. PATENT DOCUMENTS
7,536,154 B2 * 5/2009 Rudolf et al. ............ 455/69
8,010,053 B2 * 8/2011 Rudolf et al. ............ 455/69
2006/0093024 A1   5/2006 Pietraski et al.

OTHER PUBLICATIONS

International Search Report for PCT/SE2007/050097 mailed Dec. 6, 2007.
Written Opinion for PCT/SE2007/050097 mailed Dec. 6, 2007.
Soo-Yong et al., "Energy-efficient channel quality indication (CQI) feedback scheme for UMTS high-speed downlink packet access", *Vehicular Technology Conference*, Sep. 25-28, 2005, Chapter III, abstract.
Sorenson, "Performance evaluation of proportional fair scheduling algorithm with measure channels", *Vehicular Technology Conference*, Sep. 25-28, 2005, Chapter IV, abstract.
Ratsuk et al., "Power control of the high speed shared control channel", *Vehicular Technology Conference*, Sep. 25-28, 2005, Chapters II-III, abstract.
Bang Wang et al., "Performance of VoIP on HSDPA", *Vehicular Technology Conference*, Apr. 30-May 1, 2005, Chapter II, abstract.

* cited by examiner

*Primary Examiner* — Tilahun B Gesesse
(74) *Attorney, Agent, or Firm* — Nixon & Vanderhye, P.C.

(57) ABSTRACT

Method, mobile station, base station and computer program product for transmission power control in a wireless communication comprising the adjustment of the retransmission power for at least a part of an unsuccessfully received data block at a receiver according to the received information indicative of the channel qualities after an unsuccessful reception of the transmitted data block and prior to a retransmission of at least a part of the unsuccessfully transmitted data block and according to a required channel quality necessary for reaching a target BLEP (Block-Error Probability).

11 Claims, 5 Drawing Sheets

TRANSMISSION POWER CONTROL IN HSPDA

This application is the U.S. national phase of International Application No. PCT/SE2007/050097 filed 20 Feb. 2007, the entire contents of which is hereby incorporated by reference.

TECHNICAL FIELD

The present invention in its widest sense is related to the field of power adaptation in wireless communication networks.

BACKGROUND OF THE INVENTION

In today's growing demand after more bandwidth and smaller transmission delays the next step in the evolution of 3G-wireless communication networks meeting this demand will be the HSPDA (High-speed Packet Data Access) technology. HSPDA is an enhancement of the existing 3G wireless networks based on WCDMA (Wideband Carrier Division Multiple Access) Release 5 which will increase the peak downstream data rate from 384 Mb/s characteristical for WCDMA Release 99 networks to 14 Mb/s with reduced roundtrip time and retransmission delay, which on the user-side will provide for better end-user experience. On the side of operators the system capacity will be enhanced through the introduction of short TTI (Transmission Time Intervals), i.e. periods during which data is sent to the users in the wireless network and therefore better adaptated to rapidly changing transmission conditions on the radio link.

These improvements are mainly achieved by adaptive coding and modulation schemes and the transfer of the resource scheduling functionality from an RNC (Radio Network Controller) to Node B base station transceivers.

Using the adaptivity of the coding and modulation schemes employed, data transmitted from the base station to the different users may be coded and modulated in order to provide the optimum data rate possible for the individual users based on the channel quality.

Moving the scheduling functionality from the RNC to Node B base stations and thus closer to the air interface will reduce the delay time for retransmissions from typically about 100 ms in existing 3G wireless networks to about 10 ms, which is a dramatic improvement!

The HSPDA interface will also include a new high speed downlink data channel called HS-DSCH (High-Speed Downlink Shared Channel) which may be shared in the time domain by the users of the wireless network and a HS-DCCH (High-Speed Downlink Control Channel) where the control information necessary for decoding the data in the HS-DSCH for each user is stored.

The HS-DSCH is divided into 2 ms long groups of time slots called TTI (Transmission Time Intervals) during which data to the users of the wireless network is transmitted from the base station. The reduction of the TTI compared to the earlier WCDMA Release 99 will reduce the roundtrip delay between a mobile station (UE) and a base station (Node B) and achieve greater efficiency for the adaptive modulation and coding scheme, since they can be adapted more rapidly to the changing transmission conditions on the radio link.

HSPDA networks will, however, remain backward compatible with 3G wireless networks according to the WCDMA Release 99 specification.

One other important feature of HSPDA based networks will be Hybrid ARQ (Automatic Repetition reQuest) or HARQ for short. HARQ is a way of combining error detection information and error-correction codes together with ARQ when a transmission has failed. In chase combining only the part of the data that has been incorrectly received will be requested to be resent by the mobile station.

When it comes to the power necessary for transmission in HSPDA systems, it is calculated according to the required channel quality and the latest reported channel quality, i.e. the channel quality reported by a UE to a Node B during a previous data transmission.

However, in such a scenario, it is not taken into account whether the actual transmission is a completely new transmission or only a retransmission of previously erroneously received data.

Thus normally, the erroneously received data will be retransmitted by the base station to the UE after a certain amount of time based on the channel quality (CQI—Channel Quality Indicator) reported by the UE immediately before the start of the retransmission.

Figure 1:
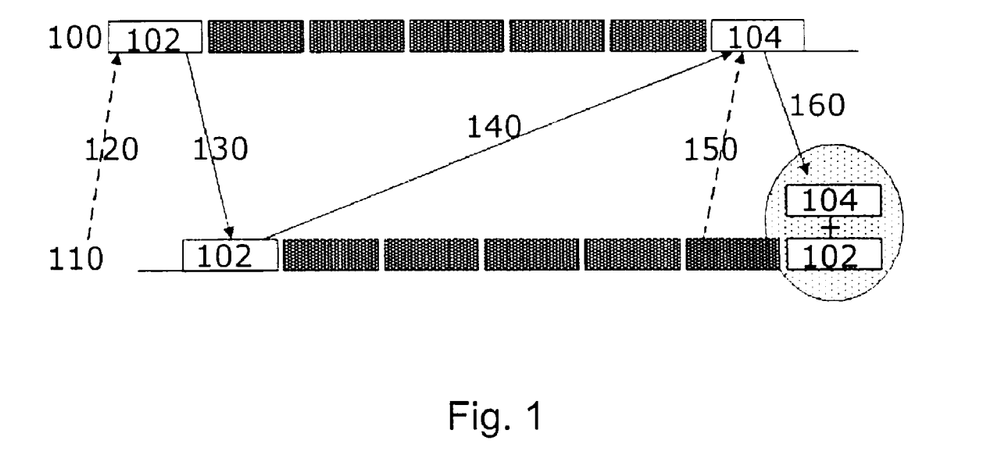
FIG. 1 illustrates the retransmission procedure in a HSPDA-based wireless communication network according to known technology.

This situation is schematically illustrated in FIG. 1.

Thus the power of the retransmitted data will usually be unnecessarily high and therefore waste resources.

The present invention aims at obviating at least partially the retransmitted power problem mentioned earlier.

SUMMARY OF THE INVENTION

The object of the invention is achieved by a method according to independent claim 1. More specifically, the object of the invention is achieved by method for transmission power control in a wireless communication network comprising a transmitter and at least one receiver comprising the steps:

a) transmitting a data block to the receiver
b) examining whether the transmitted block was correctly received
c) receiving information indicative of the channel quality after an unsuccessful reception of the transmitted data block
d) receiving further information indicative of the channel quality prior to a retransmission of at least a part of the unsuccessfully transmitted data block
e) adjusting the transmission power for at least a part of the unsuccessfully received data block according to the received information indicative of the channel qualities after an unsuccessful reception of the transmitted data block and prior to a retransmission of at least a part of the unsuccessfully transmitted data block and according to a required channel quality necessary for reaching a target BLEP (Block-Error Probability)
f) re-transmitting the least one part of the unsuccessfully transmitted data block using the adjusted transmission power and;
g) combining the at least one part of the re-transmitted data block with the previously received part of the transmitted data block.

The main advantage of the solution according to the present invention is reduction of transmission power during re-transmission using the fact that the target BLEP in the retransmission is dependent on the first transmission. Thus even a lower value of the required signal quality will ensure that the BLEP target will be met. The method may be easily implemented in existing wireless communication networks since it adheres at least to the existing HSPDA specification.

According to another aspect of the present invention the object of the invention is achieved by a mobile station for communication in a wireless communication network comprising a transceiver for transmitting and receiving data blocks or control signals to and from a BST (Base Station Transceiver) in the wireless communication network, a measurement unit for determining information indicative of the channel quality of a wireless communication channel between the mobile station and the BST, a signal processing unit for coding/decoding, modulating/demodulating a data block or a control signal and a control unit for controlling the transmission power for a data block or a control signal to be sent via the transceiver, where the control unit is adapted to control the transmission power for a re-transmitting part of an unsuccessfully received data block at the BST according to an information indicative of the channel qualities after an unsuccessful reception of the transmitted data block at the BST and prior to a retransmission of at least a part of the unsuccessfully transmitted data block to the BST and according to a required channel quality necessary for reaching a target BLEP (Block-Error Probability).

According to yet another aspect of the present invention the object of the invention is solved by a base station for communication in a wireless communication network comprising a transceiver for transmitting and receiving data blocks or control signals to one or more mobile stations in the wireless communication network, a measurement unit for determining information indicative of the channel quality of a wireless communication channel, a signal processing unit for coding/decoding, modulating/demodulating a data block or a control signal and a control unit for controlling the transmission power for a data block or a control signal to be sent via the transceiver, where the control unit is adapted to control the transmission power for at least a part of an unsuccessfully received data block at one or more of the mobile stations according to an information indicative of the channel qualities after an unsuccessful reception of the transmitted data block at the one or more mobile stations and prior to a retransmission of at least a part of the unsuccessfully transmitted data block to the one or more mobile stations and a required channel quality necessary for reaching a target BLEP (Block-Error Probability).

It may be mentioned here, that the mobile station and base station according to the present invention are specially suited for implementing the method steps according to the method of the present invention.

Finally, according to yet another aspect of the present invention, the object of the invention is achieved by computer program product adapted to function in a wireless communication network comprising instructions sets for:
a) transmitting a data block to a receiver
b) examining whether the transmitted block was correctly received
c) receiving information indicative of the channel quality after an unsuccessful reception of the transmitted data block
d) receiving further information indicative of the channel quality prior to a retransmission of at least a part of the unsuccessfully transmitted data block
e) adjusting the transmission power for at least a part of the unsuccessfully received data block according to the received information indicative of the channel qualities after an unsuccessful reception of the transmitted data block and prior to a retransmission of at least a part of the unsuccessfully transmitted data block and according to a required channel quality necessary for reaching a target BLEP (Block-Error Probability)
f) re-transmitting the least one part of the unsuccessfully transmitted data block using the adjusted transmission power and;
g) combining the at least one part of the re-transmitted data block with the previously correctly received part of the transmitted data block.

It may be added here that the computer program product according to the present invention is specially suited for executing the method steps of the method according to the present invention described above.

Details of the different embodiments of the method, the mobile station, base station and computer program product according to the present invention are defined in the accompanying dependent patent claims.

DETAILED DESCRIPTION OF PREFERRED EMBODIMENTS

FIG. 1 schematically depicts a possible data retransmission scenario in an existing wireless communication network.

A transmitter 100, in this case a BST (Base Station Transceiver) or a Node B and a receiver 110, in this case a mobile station UE, are communicating via a radio link (not shown).

Before the transmitter 100 decides to transmit data intended for the receiver 110 it first receives an indication of the channel quality from the receiver 110, which the receiver transmits in the form of a CQI-message 120 (CQI—Channel Quality Indicator). This CQI-message is related to the CQI determined by the receiver during a previous data transmission.

Thereafter, the transmitter 100 adjusts the transmit power according to the reported channel quality and sends a block of data 102 to the receiver 110 on a downlink channel 130 during a TTI (Transmission Time Interval) which in a HSPDA-based wireless network lasts approximately 3 ms.

The transmitted power for the first and second transmission may be expressed as $$P1,1 = Rx\text{QualReq} - (\text{CQI\_pre1} - \text{PCPICH} - \Gamma)$$

$$P1,2 = Rx\text{QualReq} - (\text{CQI\_cur} - \text{PCPICH} - \Gamma),$$

where P1,1 is the transmission power for block 102 and P1,2 the transmission power for block 104.

Furthermore, RxQualReq is the required received signal quality, i.e. the signal quality required to reach a certain BLEP (Block-Error Probability) target, where further CQI_pre1, indicated by the reference number 120 in FIG. 1, is the latest reported CQI before the first data transmission, CQI_cur, indicated by the reference number 150 in FIG. 1, is the latest reported CQI before the data retransmission, $\Gamma$ is the measurement offset and PCPICH is the CPICH (Common Pilot Channel) power.

The CPICH carries among others phase information and information relevant for the CQI-estimation performed by the mobile station (UE):

Now, when the UE estimates the CQI, it assumes a total received HS-PDSCH (High Speed-Physical Downlink Shared Channel) power of: PHSPDSCH=PCPICH+$\Gamma$+$\Delta$ where the measurement power offset $\Gamma$ is signaled by higher layers In this particular case, the transmitted block of data has been transmitted to the receiver 110, but is erroneously received there.

Thus, the receiver 110 transmits a NACK (Not Acknowledged) message 140 back to the transmitter 100 informing it that the transmitted data has been incorrectly received. After a certain waiting time, which may last a number of TTIs (indicated as patterned boxes in FIG. 1), the transmitter 100 attempts at retransmitting the erroneously received data blocks 104 on a downlink channel 160. However, this time the transmitted power will be adjusted according to a latest channel quality 150 reported before the retransmission.

Finally, the receiver 110 will combine the received data in the data block 102 from the first transmission with the retransmitted data in the data block 104 in order to recover the transmitted data correctly.

Figure 2:
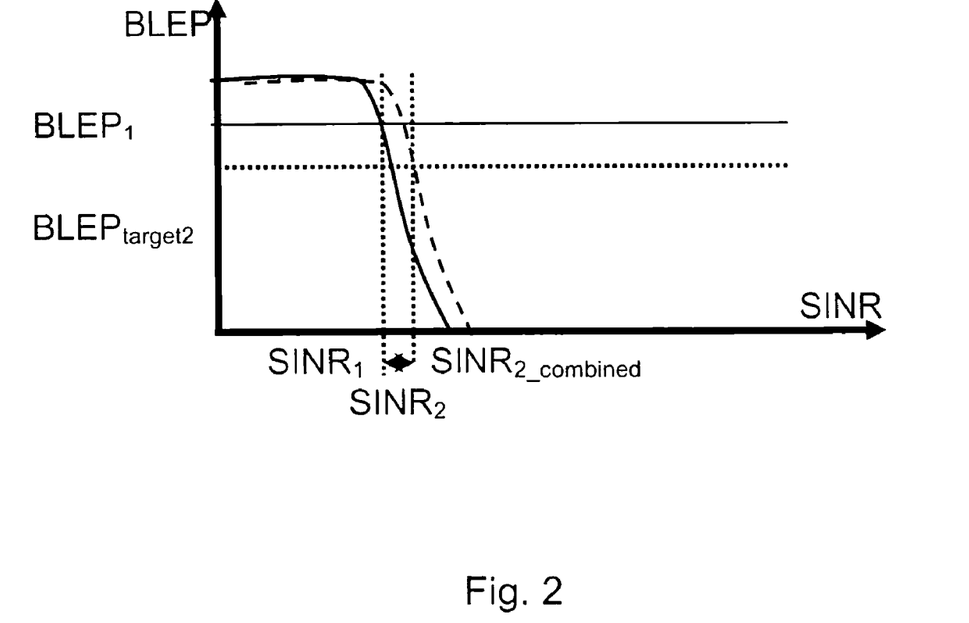
FIG. 2 shows a graph of the relation between the BLEP (Block Error Probability) and the SINR (Signal to Interference and Noise Ratio) in a typical HSPDA-based wireless communication network.

FIG. 2 illustrates a graph of the relation between the BLEP (Block Error Probability Probability) parameter and the SINR (Signal to Interference and Noise Ratio) for the signal received at the mobile station (UE):

Here $BLEP_1$ indicated by the horizontal solid line is the block error probability for the first transmitted data block which has been determined to have a $SINR_1$, indicated by the leftmost vertical dotted line, when received at the mobile station.

$BLEP_{target2}$ indicated by the horizontal dotted line indicates the target block error probability for the retransmitted data block where the required SINR is $SINR_{2\_combined}$ and indicated by the rightmost dotted vertical line.

The relation between the BLEP and the corresponding SINR for the case when the data block is retransmitted is indicated in FIG. 2 by the dashed line.

It may be mentioned here, that the BLEP target during the $2^{nd}$ transmission is defined as the number of error blocks during the $2^{nd}$ transmission divided by the number of total transmitted blocks during the $2^{nd}$ transmission.

Now, since soft combining (combination of correctly received data blocks with the retransmitted data block in the receiver) is used in a HSPDA-capable receiver in such a wireless communication network the $BLEP_{target2}$ will be dependent on the SINR and the BLEP during the first transmission. Of course, if there was no error in the first transmission, the BLEP during the second transmission will be independent on the BLEP and SINR values for the first transmission.

The present invention utilizes the fact that $BLEP_{target2}$ is a conditional probability based on the previous BLEP and SINR values. Thus, since the number of erroneously received data blocks which need to be retransmitted will be typically much smaller than the number of correctly received data blocks, a much smaller amount of SINR for the retransmitted signal is necessary in order to reach an acceptable BLEP for the retransmitted data blocks.

This smaller amount of SINR ($SINR_2$) for the retransmitted data blocks may be determined from the relation:

$$SINR_2 = SINR_{2\_combined} - SINR_1$$

Figure 3:
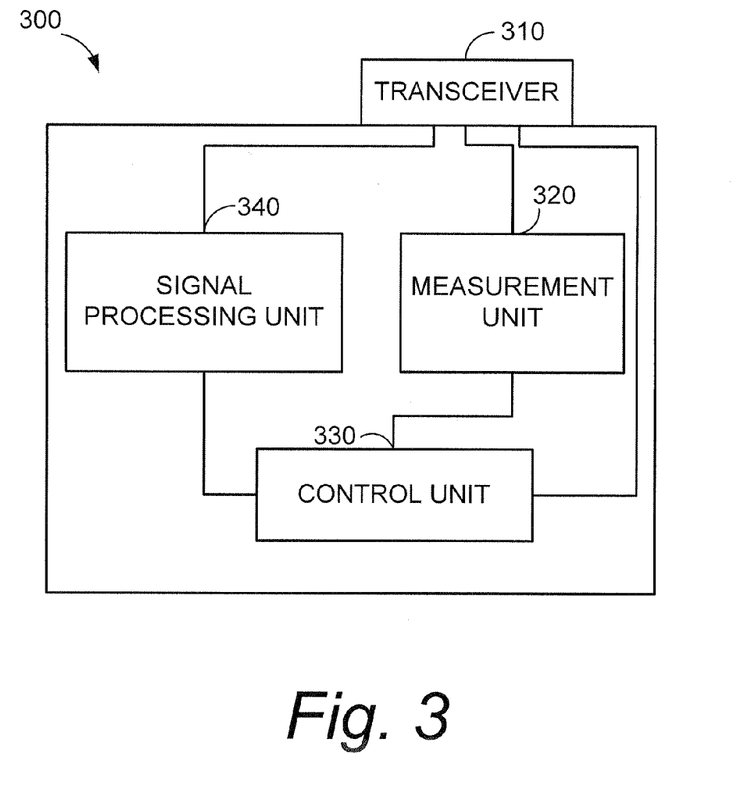
FIG. 3 is a schematical illustration of a mobile station (UE) according to one embodiment of the present invention.

Turning now to FIG. 3, a mobile station 300 according to one embodiment of the present invention is schematically illustrated.

Apart from the obvious transceiver 310, the mobile station 300 further comprises a measurement unit 320 for determining the channel quality on the downlink channel, a control unit 330 and a signal processing unit 340 for coding/decoding and modulating/demodulating a data signal.

The channel quality measured by the measurement unit 320 may be determined based on the measurement of one or more parameters characterizing the transmission conditions on the radio link, such as the SINR for the received signal, the RSSI (Received Signal Strength Indicator), BLER (Block Error Rate) and other suitable parameters.

Based on these one or more parameters or a combination of them, the measurement unit 320 sends a CQI-indicator message via the transceiver 310 to a base station which uses the value to choose an optimal channel coding and modulation index as well as a suitable transmission power for a data block to be transmitted to the mobile station 300. Although the CQI term is not defined for uplink communication, it may be possible however, that the measurement unit 320 also could perform the function of evaluating information received from a BST (Base Station Transceiver), which may be a Node B, an access point or some other node in the wireless communication performing the same function, where this information is indicative of the channel quality on the radio link between the BST and the mobile station.

Based on this information received from the BST, the mobile station 300 will adjust its transmitting power to reach a certain BLEP (Block Error Probability) target.

The measurement unit 320 may also be connected to a signal processing unit 340 which is responsible for decoding and demodulating a data block received from a BST in order to extract data from it. Since the BLER parameter may be estimated during the decoding process of the received data block the signal processing unit 340 and the measurement unit 320 are in communication with each other.

In the embodiment of the mobile station 300 according to the present invention, the signal processing unit 340 may also comprise error detecting means (not shown) for detecting erroneously received data blocks.

If the signal processing unit 340 has detected one or more erroneously received data blocks a control signal is sent to a control unit 330 which in turn transmits a NACK (Not Acknowledged) signal via the transceiver 310 back to the base station.

Also, the signal processing unit 340 is capable of combining received data blocks with retransmitted data blocks in order to recover the transmitted data signal, i.e. soft combining. This may, for example, be done using chase combining or incremental redundancy combining or some other suitable combining technique known to the skilled person.

The control unit 330, however, is not only capable of sending a simple NACK or ACK message to the base station, but also of including information on which data blocks have been erroneously received and should be resent. Naturally, the control unit 330 sends an ACK message when all data blocks transmitted by the base station have been correctly received and no retransmission is necessary. ACK/NACK messages are sent via the transmitting section of the transceiver 310 to the base station.

Furthermore, one of the main functions of the control unit 330 in transmit mode is the control of the transmission power and the signaling of coding and modulation parameters to the signal processing unit 340 based on information indicative of the channel quality received from the base station via the measurement unit 320.

Although, as already mentioned before, a CQI-message is not defined for uplink communication, the information received from the base station may correspond to the CQI sent from the mobile station to the base station.

The control unit 320 according to the embodiment of the present invention will use the fact that the BLEP (Block Error Probability) and a SINR necessary to fulfill the BLEP criterion for a possible retransmission are dependent on the BLEP and the required SINR during the previous (erroneous) transmission. This, of course, is only true if the previous transmission was in fact erroneous.

Thus using the conditional nature of the BLEP and the SINR in the retransmission, the transmission power needed to retransmit the erroneous data blocks will be reduced as opposed to known technology where this relation is not taken into account in the power control.

This will be explained more in detail in the description of the FIGS. 5-7.

The signal processing unit 340 will then code and modulate a signal to be transmitted to a BST according to control signals from the control unit 320.

It should be mentioned here that the mobile station 300 may comprise any wireless device suitable to be used as a transmitting and receiving device in a wireless communication network. These units may be chosen from the group of mobile phones, PDAs, portable computers, wireless network cards and any other device with comparable capabilities.

Figure 4:
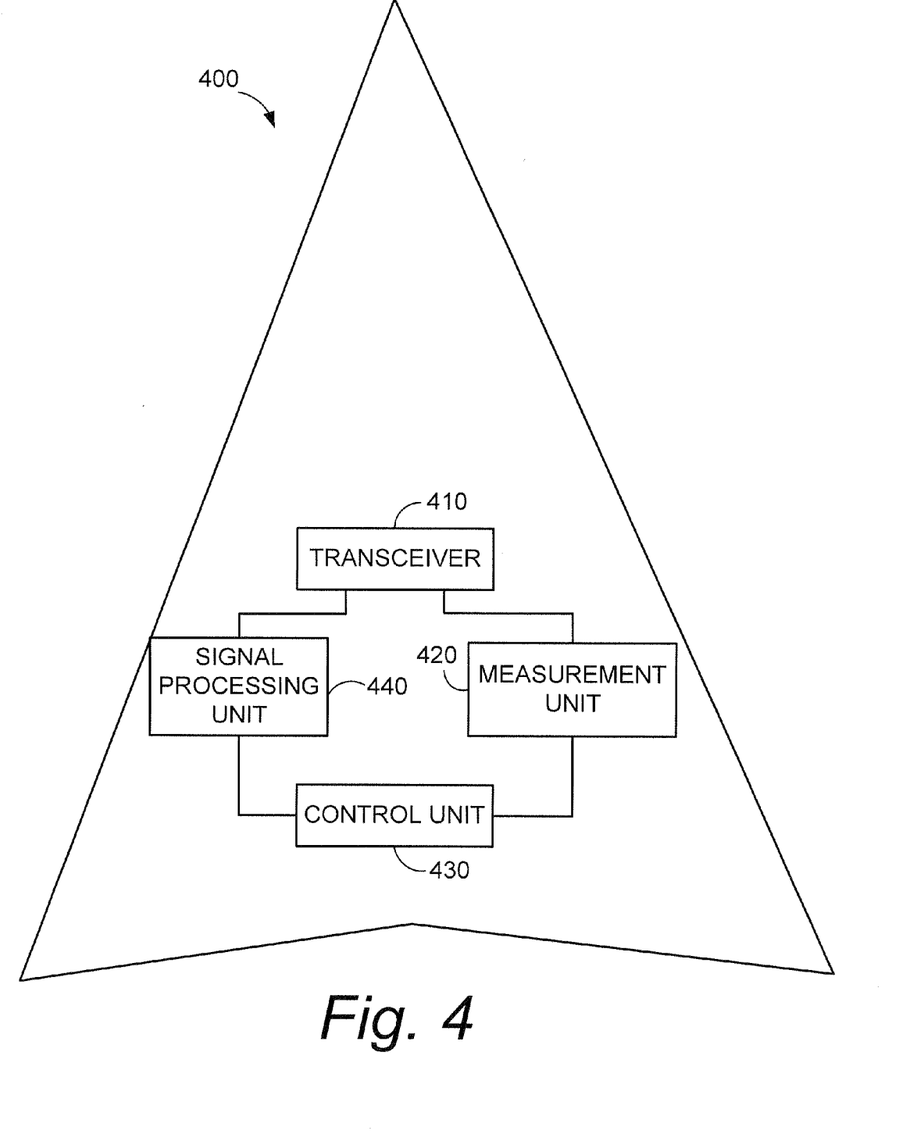
FIG. 4 is a schematical illustration of a base station according to one embodiment of the present invention.

FIG. 4 shows a schematical illustration of a base station 400 according to an embodiment of the present invention. It may be mentioned here that the term base station should be construed as to comprise all forms of wireless nodes capable of performing transmission and reception of data and radio signals over a radio link, such as BSTs (Base Station Transceivers), Node B:s, Wireless Access Points and other types of wireless nodes with transmission and reception capability.

Analogously to the internal structure of a mobile station 300 described earlier, the base station 400 also comprises a transceiver 410, a measurement unit 420, a control unit 430 and a signal processing unit 440.

Here, the transceiver circuit 410 is adapted to receive data or control signals from a core network (not shown) and to transmit them to one or more mobile stations, such as the mobile station 300 in FIG. 3, or to receive data blocks or control signals from one or more mobile stations and to forward these back to the core network or to other mobile stations in the wireless network.

The function of the measurement unit 420 is identical to the measurement unit 320 in the mobile station 300 and is used to determine the conditions on the radio channel before receiving data or control signals from one or more mobile stations in the wireless network. The determined channel quality may then transmitted via the transceiver circuit 410 to the one or more mobile stations intending to transmit data to the base station 400.

By the same token, the measurement unit 420 is capable of reporting the received CQI from a mobile station to the control unit 430 which, in turn, will take choose the optimum combination of coding rate, modulation index and transmission power to meet a certain BLEP target.

As mentioned before in the case of the mobile station 300, the channel quality may be characterized by measuring the same parameters as above, i.e. the SINR, the RSSI (Received Signal Strength Indicator), the BLER and other suitable parameters.

The information about the channel quality on the radio link may then be sent in the form of a I-message indicative of the channel quality on the radio link to the mobile station in question.

Apart from the channel quality measurement unit 420, the base station 400 likewise comprises a signal processing unit 440 which performs functions analogous to those of the signal processing unit 340 and thus those functions will not be elaborated further. However, one distinction in the function of the signal processing unit 440 in the base station 400 is that it may code/decode and demodulate data from more than one mobile station, for example of the type illustrated in FIG. 3.

If during the decoding of the data block received via the transceiver 410 the signal processing unit 440 detects an error, it sends a control signal to the control unit 430, which analogously to the control unit 330 in the mobile station 300 in FIG. 3, transmits a NACK (Not Acknowledged) signal via the transceiver 410 back to one or more of the mobile stations or mobile stations from which the data blocks have been received. This NACK-message may optionally indicate which part or parts of the received data block have been erroneously received.

Figure 5:
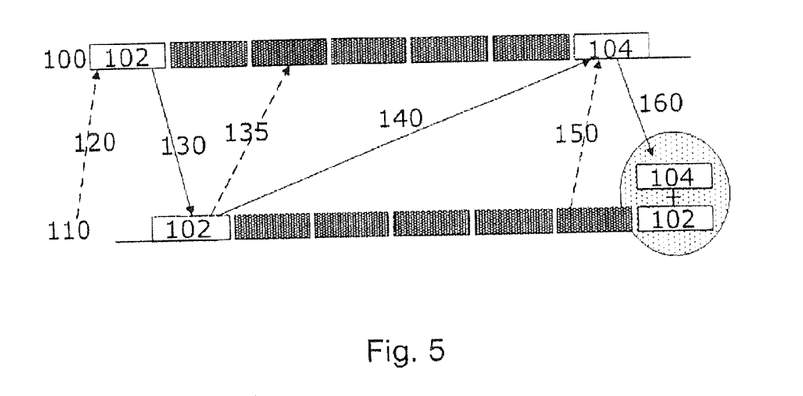
FIG. 5 illustrates the retransmission procedure according one embodiment of the present invention.

Turning now to FIG. 5 a diagram of the communication between a transmitter BST (Base Station Transceiver) 100 and a receiver UE (mobile station) 110 is shown. It may be mentioned here, that since both the BST and the UE have transceiver capabilities, the diagram would be analogous for a scenario where the UE is the transmitter and the BST the receiver.

Before the start of the first transmission, based on the received CQI-message, the BST will choose appropriate coding and modulation parameters and adjust the transmission power in order to reach a calculated BLEP target.

Then, a first data block 102 is coded and modulated and sent on the downlink channeö 130 with a transmission power P1,1 to the UE 110.

This transmission power P1,1 will be equal to the transmission power presented in the description in FIG. 1, i.e.:

$$P1,1 = Rx\text{QualReq} - (CQI\_pre1 - PCPICH - \Box\Gamma)$$

Now, the received block 102 has been received in error at the receiver.

There are a number of reasons why the transmitted data block 102 may be received in error.

For one, the channel quality CQI_pre2 135 during transmission may not be as good as the channel quality a UE 110 reported CQI_pre1 120. This may be due to rapidly changing conditions on the downlink channel which are difficult to predict.

However, even if the channel quality CQI_pre2 135 during transmission is as good as the channel quality a UE reported CQI_pre1 120, there is still a possibility that the block is received in error since the power in the first transmission is set according to a certain BLEP target.

But compared to known technology, instead of waiting a number of TTI:s (indicated by the boxes in the same row as the block 102) before choosing to take a CQI from a UE for retransmission into account, the BST may choose to receive a CQI-message from the UE, when it is informed that the reception of the last transmitted data block was not acknowledged. This CQI-message will here be called CQI_pre2 and referred to as 135 in FIG. 5 is the reported CQI after the first transmission.

Note however, that the CQI-message may be sent continuously by the mobile station to the base station, such as, for example every 2 ms or every 8 ms.

Also, the NACK (Not Acknowledged) message sent from the UE to the BST is indicated by the arrow 140. This NACK-message may additionally contain information on which parts of the erroneously transmitted data block 102 should be retransmitted.

After a certain amount of TTI:s which may be predefined, using the information from CQI_cur 150 and the previously received CQI-messages CQI_pre1 120 and CQI_pre2 135 the necessary transmission power P1,2 for the retransmission of the erroneously received data blocks 104 will be controlled by the BST.

In the case of chase combining this retransmission power may be expressed as:

$P1,2 = RxQualReq2 - (CQI\_cur - PCPICH - \Gamma)$, where $RxQualReq2 = lin2db(db2lin(RxQualReq2\_comb) - db2lin(RxQual\_real1))$, where $RxQual\_real1 = CQI\_pre2 - PCPICH - \Gamma + P1,1$.

Here, lin2db is a function for linear-to-decibel conversion and db2lin is the function for decibel-to-linear conversion.

In the relations above, RxQual_real1 the real received signal quality during the first transmission, whereas RxQualReq2_comb is the required combined received signal quality for the second transmission, which could be calculated based on the BLEP target for retransmission according to the link level curves in FIG. 2 As mentioned earlier, the BLEP for the retransmission, i.e. BLEP2, for a certain SINR_combined, is dependent on the BLEP1 and the SINR1 during the first transmission.

For chase combing, it also easy to obtain the BLEP2 vs. SINR2_combined curves according to the BLEP vs. SINR curve during the first transmission. In the first transmission, if BLEP=f(SINR), i.e. the BLEP for the first transmission is a function of the SINR for the first transmission, then BLEP2=f (SINR_combined)/BLEP1.

This is indicated by the transmission of the erroneously transmitted data blocks 104 with a transmission power P1,2 160 which are combined with the received data blocks indicated by the diagram "104+102" in FIG. 5.

The advantage of the solution according to the embodiment in FIG. 5 is that the power needed for the retransmission of the erroneously received data blocks 104 is reduced compared to the retransmission power in wireless networks using known technology, since the lower power will be sufficient to meet the BLEP target and SINR parameters as they depend on the previous transmission. This will be illustrated more in detail in FIG. 7

Figure 6:
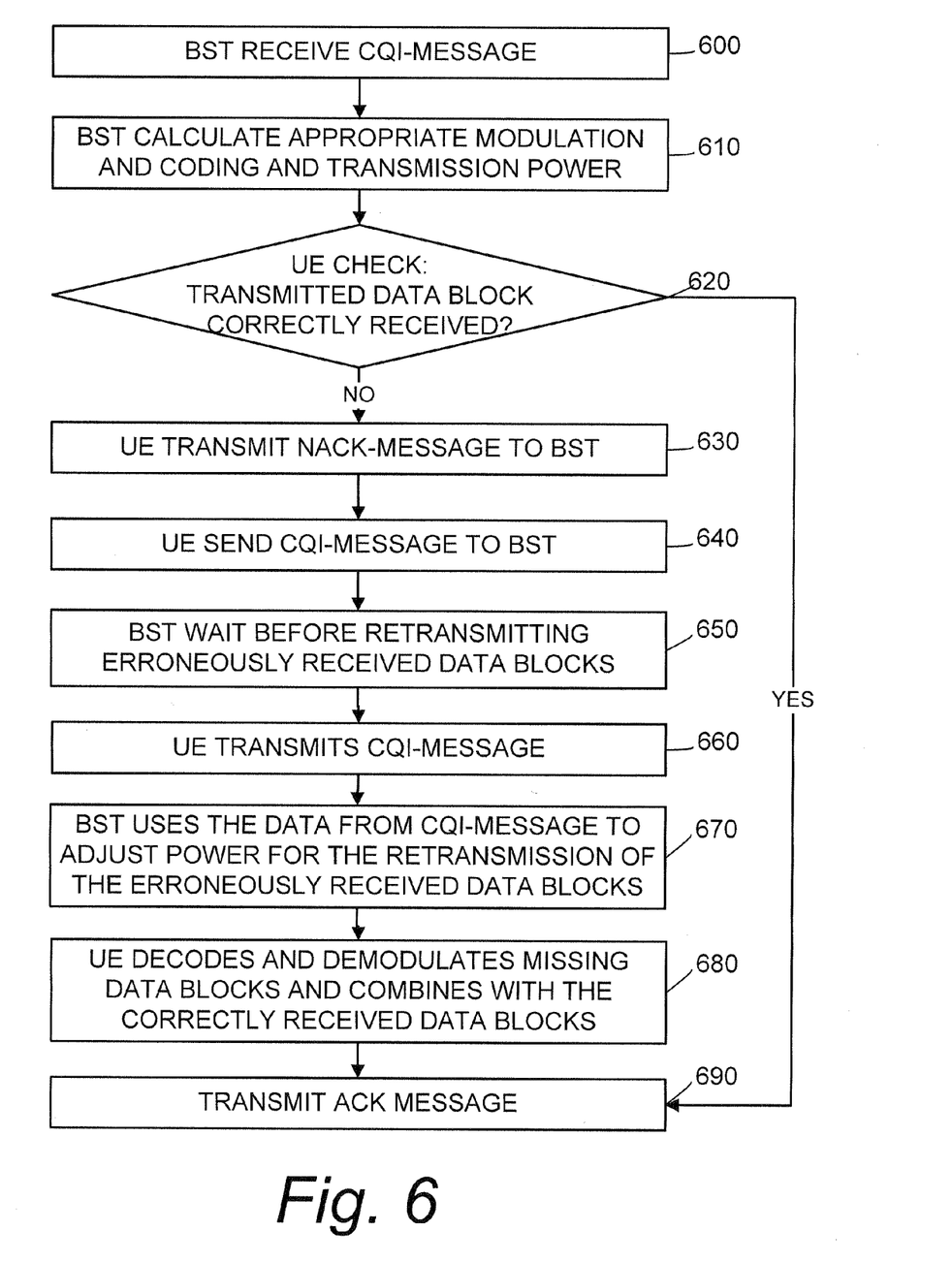
FIG. 6 depicts the method steps according to one embodiment of the present invention.

Turning now to FIG. 6, an example embodiment of the method according to the present invention is presented. It will be described from for the situation where the BST is the transmitter and the UE the receiver, but the method will work both ways, i.e. also when the UE is the transmitter and the BST receiver. The difference in this case would be that no CQI-message as known by the skilled person is sent from the BST to the UE, but a corresponding message indicative of the channel quality on the wireless link between the BST and the UE.

At step 600 a transmitter, such as, for example a BST receives a CQI-message (CQI_pre1) from a receiver, such as a UE, where the channel quality from a previous transmission is reported.

Using this information, at step 610 the BST calculates the appropriate modulation and coding as well as the necessary transmission power for the data block to be transmitted to the UE and transmits the thus modulated and coded data block to the UE.

Next, at step 620, the UE checks whether the transmitted data block has been correctly received. This may be for example be done by performing a so called CRC (Cyclic Redundancy Check) on the data in order to determine if the data has been altered on its way on the downlink channel or through some other error check method known to the person skilled in the art.

If the data block 102 after the CRC check has been determined to be correctly received by the UE, the UE transmits an ACK message to the BST at step 690.

Of course, if the conditions on the radio link are so severe that the BST does not receive the ACK-message (not shown), the BST interprets this as a NACK-message. However, even in this case, the method described in FIG. 6 will work.

Naturally, if the BST has received an ACK-message at step 690, but the transmission consists of several more data blocks, the BST may after step 690 proceed to check if the successfully transmitted data block was the last data block to be transmitted to the UE (not shown).

However, if the UE during the CRC-check determines that some data has been altered, it transmits a NACK-message to the BST at step 630, since obviously some parts of the transmitted data block have been received in error.

According to the embodiment of the method of the present invention in FIG. 6, the UE at step 640 will then send a CQI-message 135 to the BST after it has determined that the transmitted data block 102 was received in error. This CQI-message, i.e. CQI_pre2 135, contains information on the channel quality during the first (erroneous) transmission.

Next, at step 650 the BST will wait a number of TTI:s before retransmitting the erroneously received data blocks 104 to the UE. During this waiting period, the BST may transmit data blocks intended for other UE:s. (or the same UE, but different HARQ process number.)

At step 660, the mobile station transmits a CQI-message, i.e. CQI_cur 150 to the BST, reporting the latest currentchannel quality prior to the retransmission.

Then, at step 670, the BST uses the data on the channel quality from the CQI-messages CQI_pre1 120, i.e. the channel quality prior to the first transmission, CQI_pre2 135, that is, the channel quality during the first transmission and CQI_cur 150, i.e. the channel quality just prior to the retransmission of the erroneously received data together with information on the power on the common pilot channel (PCPICH) in order to adjust the power for the retransmission of the erroneously received data blocks 104. In this fashion, the method according to the present invention will take advantage of the fact that the retransmission power is dependent on the transmission power during the first (partly successful) transmission and therefore, may be reduced.

Also, the BST may use the channel quality information contained in the CQI_cur in order to choose the appropriate modulation and coding for the data blocks and finally transmits the data blocks received in error at step 620 to the UE. This is dependent on the combination method, since in chase combining, for example, the same modulation index and coding rate is used for the retransmission of the erroneously received data sub-blocks.

At step 680, the UE decodes and demodulates the missing data blocks 104 and combines them with the correctly received data blocks 102 at step 620.

Thereafter, at step 690 the UE transmits an ACK-message to the BST informing it about the correct reception of the data blocks.

It may be of course happen, that some data blocks are received in error again at the UE, which may be solved by repeating an iteration of the method according to the present invention in FIG. 6 (not shown). The transmission power for the second retransmission would be even lower in that case.

Naturally, the embodiment of the method according to the present invention presented in FIG. 6 is well suitable to be implemented by a computer program product adapted to function in a wireless communication network.

Figure 7:
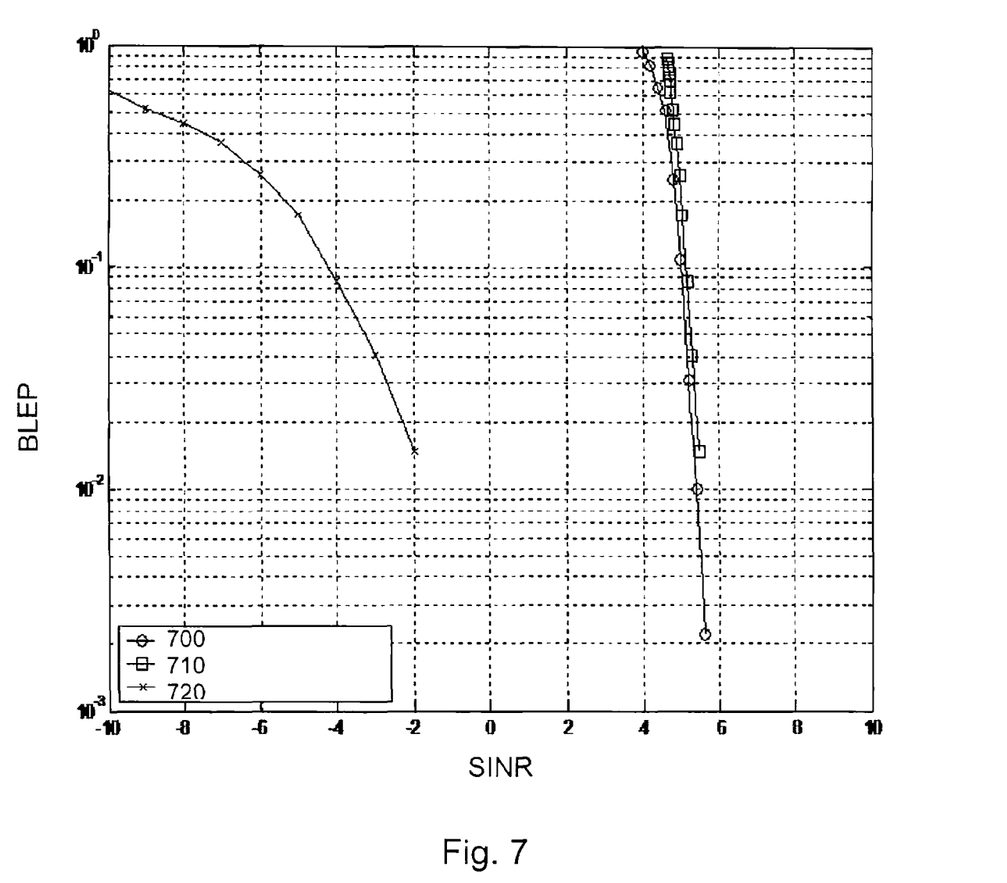
FIG. 7 a graph of the simulation results for the BLEP as a function of the measured SINR.

FIG. 7 shows a simulation run of the method according to the present invention where the diagram shows the BLEP as a function of SINR, expressed in dB.

The curve with the circle with the reference number 700 represents the BLEP vs. SINR for the first transmission. It is clear from the graph how small improvements in the SINR value lead to dramatic reductions in the BLEP.

The curve with the square referred to as 710 represents the BLEP vs. combined SINR after the $2^{nd}$ transmission, i.e. the SINR containing both the SINR from the first transmission and the SINR for the $2^{nd}$ transmission or retransmission. The curve with the x-mark referred to as 720 represents the BLEP vs. the SINR of the second transmission consisting only of the SINR for the retransmission.

Now if BLEP1 is the BLEP during the $1^{st}$ transmission and BLEP2 the BLEP during the $2^{nd}$ transmission, then the BLEP for the second transmission is defined as the number of error blocks during the $2^{nd}$ transmission divided by the number of transmitted blocks during the $2^{nd}$ transmission.

Obviously, when using some kind of combining technique in for the retransmitted data block in the receiver, the ratio of the number of error blocks to the number of transmitted blocks will be reduced, since at least some data blocks will have been correctly received.

Thus, the BLEP2 in the second transmission is a kind of conditional probability (the condition is there is error in the first transmission.), which means that different BLEP1 (SINR1) during the $1^{st}$ transmission will have different BLEP curves during the $2^{nd}$ transmission. The smaller BLEP1, the larger the difference between the circle curve and the square curve is. Since different BLEP1 will have different square curves, for the simulation with two transmissions here, it is assumed that BLEP1 is 50% for the $1^{st}$ transmission.

From FIG. 7, it can be seen that a small SINR in the $2^{nd}$ transmission, −2 dB for example, can still reach very good performance since there is information in the $1^{st}$ transmission.

The invention claimed is:

1. A method for transmission power control in a wireless communication network comprising a transmitter and at least one receiver comprising the steps:
   a) transmitting a data block to the receiver;
   b) examining whether the transmitted block was correctly received;
   c) receiving information indicative of the channel quality after an unsuccessful reception of the transmitted data block;
   d) receiving further information indicative of the channel quality prior to a retransmission of at least a part of the unsuccessfully transmitted data block;
   e) adjusting the transmission power for at least a part of the unsuccessfully received data block according to the received information indicative of the channel qualities after an unsuccessful reception of the transmitted data block and prior to a retransmission of at least a part of the unsuccessfully transmitted data block and according to a required channel quality necessary for reaching a target BLEP (Block-Error Probability);
   f) re-transmitting the least one part of the unsuccessfully transmitted data block using the adjusted transmission power, and;
   g) combining the at least one part of the re-transmitted data block with the previously received part of the transmitted data block.

2. The method according to claim 1 wherein an unsuccessful reception of the transmitted data block is indicated by a NACK (Not-Acknowledged) message.

3. The method according to claim 2 wherein said NACK-message additionally comprises information indicative of which parts of the unsuccessfully received data block have been unsuccessfully received.

4. The method according to claim 1 wherein the combination of the at least one part of the re-transmitted data block with the previously received part of the data block comprises chase combining, incremental redundancy combining or some other soft combining technique.

5. The method according to claim 1 wherein said information indicative of the channel quality comprises a CQI (Channel Quality Indicator).

6. The method according to claim 1 wherein a waiting time period of one or more TTI:s (Transmission Time Intervals) is introduced before re-transmission of the unsuccessfully transmitted data sub-blocks.

7. The method according to claim 1 wherein if said retransmitted part of the unsuccessfully received data block is again received in error, the method re-iterates the steps c)-g) until the complete data block has been correctly received.

8. A mobile station for communication in a wireless communication network comprising:
   a transceiver for transmitting and receiving data blocks or control signals to and from a BST (Base Station Transceiver) in the wireless communication network;
   a measurement unit for determining information indicative of the channel quality of a wireless communication channel between the mobile station and the BST;
   a signal processing unit for coding/decoding, modulating/demodulating a data block or a control signals;
   a control unit for controlling the transmission power for a data block or a control signal to be sent via the transceiver;
   the control unit being adapted to control the transmission power for a re-transmitting part of an unsuccessfully received data block at the BST according to an information indicative of the channel qualities after an unsuccessful reception of the transmitted data block at the BST and prior to a retransmission of at least a part of the unsuccessfully transmitted data block to the BST and according to a required channel quality necessary for reaching a target BLEP (Block-Error Probability);
   wherein said signal processing unit is adapted to combine the re-transmitted part of the unsuccessfully received data block at the BST with the successfully received part of the transmitted data block at the BST; and
   wherein the BLEP for a retransmission of at least a part of an unsuccessfully received data block is dependent on the BLEP for an unsuccessfully transmitted data block and defined as the ratio between the number of unsuccessfully received data sub-blocks at the BST to the number of totally transmitted data sub-blocks to the BST.

9. The Mobile station according to claim 8 wherein said measurement unit is adapted to receive information from a BST in the wireless communication network indicative of the channel quality of the wireless communication channel.

10. A base station for communication in a wireless communication network comprising:

a transceiver for transmitting and receiving data blocks or control signals to or from one or more mobile stations in the wireless communication network;

a measurement unit for determining information indicative of the channel quality of a wireless communication channel;

a signal processing unit for coding/decoding, modulating/demodulating a data block or a control signal;

a control unit for controlling the transmission power for a data block or a control signal to be sent via the transceiver, wherein the control unit is adapted to control the transmission power for at least a part of an unsuccessfully received data block at one or more of the mobile stations according to an information indicative of the channel qualities after an unsuccessful reception of the transmitted data block at the one or more mobile stations and prior to a retransmission of at least a part of the unsuccessfully transmitted data block to the one or more mobile stations and a required channel quality necessary for reaching a target BLEP (Block-Error Probability);

said signal processing unit is adapted to combine the re-transmitted part of the unsuccessfully received data block at one or more of the mobile stations with the successfully received part of the transmitted data block at the one or more mobile stations; and the BLEP for a re-retransmission of at least a part of an unsuccessfully received data block is dependent on the BLEP for an unsuccessfully transmitted data block and defined as the ratio between the number of unsuccessfully received data sub-blocks at the one or more mobile station to the number of totally transmitted data sub-blocks to the one or more mobile stations.

11. The base station according to claim 10 wherein said measurement unit is adapted to receive information from one or more mobile stations in the wireless communication network indicative of the channel quality of the wireless communication channel.

* * * * *

UNITED STATES PATENT AND TRADEMARK OFFICE
CERTIFICATE OF CORRECTION

PATENT NO. : 8,121,555 B2
APPLICATION NO. : 12/527468
DATED : February 21, 2012
INVENTOR(S) : Miao et al.

It is certified that error appears in the above-identified patent and that said Letters Patent is hereby corrected as shown below:

On the Face Page, in Field (57), under "ABSTRACT", in Column 2, Lines 1-2, delete "Method, mobile station, base station and computer program product" and insert -- Method, mobile, base station --, therefor.

In Column 8, Line 36, delete "channeö" and insert -- channel --, therefor.

In Column 10, Lines 36-37, delete "currentchannel" and insert -- current channel --, therefor.

In Column 11, Line 65, in Claim 1, delete "the least" and insert -- the at least --, therefor.

In Column 12, Line 62, in Claim 9, delete "Mobile" and insert -- mobile --, therefor.

Signed and Sealed this
Tenth Day of July, 2012

David J. Kappos
*Director of the United States Patent and Trademark Office*